(12) United States Patent
Osborn et al.

(10) Patent No.: US 7,430,306 B1
(45) Date of Patent: Sep. 30, 2008

(54) METHODS AND APPARATUS TO VERIFY IDENTITY USING BIOMORPHIC INFORMATION

(75) Inventors: Kevin Osborn, Newton, MA (US);
Ryan S. O'Connell, Chester, NH (US);
Kyle T. Grucci, Southwick, MA (US);
Lance J. Andersen, Boxboro, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 637 days.

(21) Appl. No.: 11/076,781

(22) Filed: Mar. 10, 2005

(51) Int. Cl.
*G06K 9/00* (2006.01)

(52) U.S. Cl. .................... 382/115; 340/5.52; 340/5.6; 340/5.82; 382/218; 705/44; 705/75; 713/186

(58) Field of Classification Search ............. 235/380; 340/5.2, 506, 573.1, 5.52, 5.53, 5.6, 5.8, 340/5.82, 5.83; 356/71; 382/100, 115, 116, 382/124, 125; 600/300; 705/67, 44, 75; 713/186, 202, 182, 185
See application file for complete search history.

(56) References Cited

U.S. PATENT DOCUMENTS

| | | | | |
|---|---|---|---|---|
| 5,815,252 A * | 9/1998 | Price-Francis | ................ | 356/71 |
| 5,869,822 A * | 2/1999 | Meadows et al. | ............ | 235/380 |
| 6,208,264 B1 * | 3/2001 | Bradney et al. | .............. | 340/5.2 |
| 6,335,688 B1 * | 1/2002 | Sweatte | .................... | 340/573.1 |
| 6,819,219 B1 * | 11/2004 | Bolle et al. | ................ | 340/5.52 |
| 6,980,670 B1 * | 12/2005 | Hoffman et al. | ............. | 382/115 |
| 7,131,009 B2 * | 10/2006 | Scheidt et al. | ............... | 713/182 |
| 7,274,807 B2 * | 9/2007 | Hillhouse et al. | ........... | 382/124 |
| 7,318,550 B2 * | 1/2008 | Bonalle et al. | ............... | 235/380 |
| 2002/0021001 A1 * | 2/2002 | Stratford et al. | ................ | 283/74 |
| 2002/0097142 A1 * | 7/2002 | Janiak et al. | ................ | 340/5.53 |
| 2002/0178124 A1 * | 11/2002 | Lewis | .......................... | 705/67 |
| 2003/0135740 A1 * | 7/2003 | Talmor et al. | ................ | 713/186 |
| 2003/0149343 A1 * | 8/2003 | Siegel et al. | ................. | 600/300 |
| 2003/0223625 A1 * | 12/2003 | Hillhouse et al. | ........... | 382/125 |
| 2004/0034783 A1 * | 2/2004 | Fedronic et al. | ............. | 713/186 |
| 2004/0059953 A1 * | 3/2004 | Purnell | ....................... | 713/202 |
| 2004/0172535 A1 * | 9/2004 | Jakobsson et al. | ........... | 713/168 |
| 2005/0207614 A1 * | 9/2005 | Schonberg et al. | .......... | 382/100 |
| 2005/0289058 A1 * | 12/2005 | Hoffman et al. | .............. | 705/44 |
| 2006/0156027 A1 * | 7/2006 | Blake | ......................... | 713/186 |
| 2006/0222211 A1 * | 10/2006 | Olivo et al. | ................. | 382/115 |
| 2008/0072064 A1 * | 3/2008 | Franchi | ..................... | 713/186 |

* cited by examiner

*Primary Examiner*—Gregory M Desire
(74) *Attorney, Agent, or Firm*—Brooks Kushman P.C.

(57) ABSTRACT

A method of verifying the identity of a user by comparing a biomorphic sample from the user with a stored biomorphic pattern of the user, without access to an online database of encoded biomorphic patterns. An authorization process receives an encoded biomorphic pattern from the user, the encoded biomorphic pattern stored on a storage device containing a processor. The processor is powered by a device capable of reading the storage device. The authorization process verifies the encoded biomorphic pattern is a valid biomorphic pattern with a valid expiration date, and compares the encoded biomorphic pattern on the storage device to a biomorphic sample provided by the user, in order to grant access to the user. If an online database is available, authorization process transmits the result to the online database and receives, in return, an updated expiration date. The authorization process updates the storage device with the updated expiration date.

24 Claims, 5 Drawing Sheets

216 STORE A RESULT OF THE COMPARISON BETWEEN THE BIOMORPHIC SAMPLE AND THE ENCODED BIOMORPHIC PATTERN

217 DETERMINE IF AN ONLINE AUTHORIZATION DATABASE IS ACCESSIBLE

218 VERIFY AN AUTHORIZATION ACCESS OF THE USER WITH THE ONLINE AUTHORIZATION DATABASE IN ORDER TO EXTEND THE AUTHORIZATION ACCESS OF THE USER

219 TRANSFER THE RESULT OF THE COMPARISON TO THE ONLINE AUTHORIZATION DATABASE

220 RECEIVE AN ENCODED AUTHORIZATION TOKEN FROM THE ONLINE AUTHORIZATION DATABASE

221 UPDATE THE ENCODED BIOMORPHIC PATTERN WITH THE ENCODED AUTHORIZATION TOKEN, IN ORDER TO EXTEND THE AUTHORIZATION ACCESS OF THE USER

FIGURE 5

METHODS AND APPARATUS TO VERIFY IDENTITY USING BIOMORPHIC INFORMATION

BACKGROUND

Conventional computerized biomorphic identification systems provide security by receiving a biomorphic sample from a person whose identity is to be authenticated. The data from the sample is then compared to a pre-collected biomorphic data sample maintained in a database of samples. If the pattern received from the person matches the pattern in the database, then the person's identity is authenticated and access is granted. As an example, consider a conventional biomorphic authentication system such as an iris scanning security system. Iris or retina (e.g., eye) scanning systems operate by comparing a biomorphic sample from a user, (e.g. a scan of the user's iris converted to an encoded biomorphic pattern) against an online database of encoded biomorphic iris scans, to determine if the biomorphic sample provided by the user matches the encoded biomorphic iris pattern stored in the database of the computerized biomorphic identification system. If the biomorphic iris scan sample provided by the user matches the encoded biomorphic pattern in the database that was collected from that user at an earlier time (e.g., under controlled conditions where that persons identity could be verified in other ways), then the identity of the user is verified at the time of providing the iris scan, and the user has successfully passed the security check.

Biomorphic identification systems have become increasingly popular as a security measure because the biomorphic samples obtained from the user are unique to each individual and are difficult to recreate (e.g, for falsification purposes). Biomorphic authentication and access control systems can easily verify biomorphic samples in real-time against the online database of encoded biomorphic patterns by requiring the user to provide a quick, non invasive, biomorphic sample. Examples of biomorphic information can include fingerprint scans, iris or retina scans, weight and height measurements, voice samples provided for analysis, blood samples, biorhythms (e.g., brainwaves analysis) and so forth.

One use of biomorphic identification systems is a computerized biomorphic identification system that would allow employees access to buildings simply by providing a biometric sample. An employee could provide this sample, such as a retina scan, by looking into a lens, which would take a digital picture of the employee's eye. A comparison of the employee's iris or retina scan against an encoded scan stored in the security system's database, would determine if the employee had access to that building.

SUMMARY

Conventional technologies for identity verification suffer from a variety of deficiencies. In particular, conventional technologies that verify identity by comparing a unique biomorphic sample from a person (e.g. a finger print, iris scan, etc) to an online database of encoded biomorphic patterns, to verify the identity of the person, are limited by the availability and accessibility of the online database containing the pre-collected data used for the data comparison made to determine the access control decision. For example, airlines might verify the identity of passengers boarding a flight as part of a pre-flight security check. Each passenger boarding the plane would give a non-invasive biomorphic sample, such as an iris scan. The biomorphic sample would be compared against an online database of encoded biomorphic patterns (e.g. digitized iris scans) in order to verify the identity of each passenger. However, if the online database is unavailable or becomes overwhelmed with requests for data, the system can fail or slow down to a point of un-usability, and thus the security system is virtually useless in terms of verifying the identity of the passengers boarding the plane. In this situation, other more tedious, time consuming, and invasive measures (i.e. patting down passengers, body searches, etc) must be taken to screen passengers before they can board the plane. Such manual identity checking is prone to human error and identity falsification.

Embodiments disclosed herein significantly overcome such deficiencies and provide a system that includes a computer system executing an authorization process of verifying the identity of a user by reading an identification card with a magnetic strip, such as a RFID identification card, containing an encoded biomorphic pattern, and comparing that encoded biomorphic pattern with a biomorphic sample provided by the user undergoing the identity verification process. The identification card contains a digitally signed biomorphic pattern verifying it as a valid biomorphic pattern (i.e., verifying that at the time the card was encoded with the biomorphic sample data or pattern, the identity of the person from which the biomorphic data was collected and placed into the identification card was verified by some alternate means). In the event an online database of biomorphic patterns is unavailable, security personnel or an access control system can compare the encoded biomorphic pattern on the identification card with the biomorphic sample provided by the user, to securely verify the identity of that user. In this manner, systems configured as disclosed herein do not require access to a remote database of securely collected biomorphic patterns. Instead, a person requiring access can simply provide the identification card containing a pre-encoded biomorphic pattern and can also provide, in real time, a biomorphic sample of themselves, such as providing a fingerprint or iris for real time scanning. If the scan data collected from the iris or fingerprint matches the data on the card, then the person is granted access. The system prevents un-allowed access in the event another person uses an identification card since the sample provided by the other person would not match the data encoded on the card.

In one example configuration, a user may be equipped with a pre-encoded identification card containing a storage device having pre-collected biomorphic data encoded therein. This data may be iris data, for example. In operation, the user places the storage device in reader. At about the same time, the user also supplies a biomorphic sample that in this case would be an actual scan of that person's iris. At this point, the reader then encodes the biomorphic data collected from the iris scan and attempts to contact an online database to verify this user's biomorphic sample data with some stored online sample data previously collected form the user. If the online database information is available from the database, and the user is verified according to stored biomorphic information, then a new lease can be written to the identification card containing the storage device (e.g., a Javacard, etc.). Such a lease can specify, for example, an expiration date for the card. If the database is off-line, the reader compares the biomorphic sample input (i.e., the iris scan) to the biomorphic data stored on the storage device within the identification card. If the data scanned form the user and the data in the card match, then the reader checks the lease on the identification card to ensure the lease is still valid. If all of these comparisons check out (i.e., pass), the user is verified. If either the iris scan data does not match the iris data in the card, the verification is denied. Likewise, if the lease is expired, verification is also denied. It is to be understood that this illustrates a brief example of the use of embodiments disclosed herein, and other operations are proposed as well.

During another example operation of one embodiment, suppose passengers boarding an airplane carry an identification card that has an encoded biomorphic pattern on it, such as an iris scan. The identification card can be compared to an iris scan provided on the spot, by the passenger, to verify the passenger's identity. The verification process can be completed quickly and does not require a remote connection to a biomorphic data server.

To obtain the identification card, passengers might have to have had previously passed a security checking process during which their iris is photographed, using a high resolution digital camera. The digital image of the iris is converted to a biomorphic pattern by mapping the unique details (e.g., unique spots, pigments, etc) of the iris, in a spiral fashion, working from the outside of the iris toward the center. The biomorphic pattern is then digitally signed (e.g. digitally encrypted) to verify its authenticity, and to prevent tampering. The digitally signed biomorphic pattern indicates a central authorizing entity has verified the identity of the person whose digitally signed biomorphic pattern is on the identity card. The identity card on which the encoded biomorphic pattern is stored is a storage device capable of storing and computing data, such as a JavaCard, which is capable of storing digital information. The identity card contains a processor, which is powered by a card reader. Also stored on the identification card is a digitally signed authorization key with an expiration date.

During the authorization process, the passenger presents their identification card to security personnel. In one configuration the identification card contains a processor that is powered by the card reader (i.e., by a radio signal transmitted to the card) to allow the processor in the card to transmit the biomorphic data pre-encoded in the card to the reader. The card reader receives this information from the card and verifies that the encoded biomorphic pattern on the identification card is properly signed (e.g. digitally encrypted) by the central authorizing entity which issued the identification card, meaning the encoded biomorphic pattern is an acceptable biomorphic pattern. For example, a central certifying authority can equip the reader ahead of time (e.g., during reader installation) with a public key of the central authority that created the cards. If the encoded biomorphic pattern is not an acceptable biomorphic pattern, the authorization process rejects authorization, and the passenger is not granted access to board the plane.

If the encoded biomorphic pattern is an acceptable biomorphic pattern (i.e., is verified to be one created by the central authority), then the passenger gives (i.e., is prompted to provide) a biomorphic sample, such as an iris scan. In one embodiment, the passenger gives more than one physical biometric characteristic, such as an iris scan, a fingerprint, and a voice sample (or any combination of different samples of different biomorphic data). The system converts the physical, biometric characteristics obtained from the sample to biomorphic sample(s) (e.g., digital data) to be used during a comparison process with the encoded biomorphic pattern obtained from the card.

A comparison is performed between the encoded biomorphic pattern(s) stored on the identification card, and the biomorphic sample(s) given by the passenger. If the biomorphic sample(s) given by the passenger does not match the encoded biomorphic pattern(s) on the identification card, the authorization process rejects authorization, and the passenger is not granted access to board the plane. Additionally, the reader can then transmit a signal to the card to de-authorize the card for future use in the system (e.g., after a certain number of failed attempts to perform a matching comparison).

In one configuration, also stored on the identification card is an encoded authorization token containing an expiration date, which is a component of the digital signature from the central authority entity. If the expiration date has expired, the authorization process rejects authorization, and the passenger is not granted access to board the plane. If the expiration date is still valid, the passenger is granted access to board the plane.

In one embodiment, the encoded authorization token contains access information, detailing the amount of information the card reader is authorized to read from the identification card. Card readers are granted different levels of security access to the information on the identification card.

In one embodiment, the computer system stores the result of the authorization process locally on the computer system performing the authorization process. These results can be uploaded to an online database at a later time.

In one embodiment, the authorization process determines if an online database is accessible. If the online database is connected and available, the authorization process verifies the authorization access of the passenger with the online database, in order to extend the authorization access of the passenger. The authorization process then transfers the result of the comparison between the encoded biomorphic pattern contained on the identification card, with the biomorphic sample provided by the passenger, to the online database. The computer system running the authorization process receives from the online database, an encoded authorization token with an updated expiration date. The authorization process updates the identification card with the encoded authorization token containing the updated expiration date. This extends the authorization access of the passenger for the next time the passenger tries to board a plane, and has to pass the same authorization process. Passengers who fly frequently and routinely pass the authorization process, are considered more of a safe risk than passengers who fly infrequently, and who have not had the encoded authorization token on their identification card updated recently with a new expiration date.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Sun Microsystems, Inc. of Santa Clara, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 5 illustrates a flowchart of a procedure performed by the system of FIG. 4, when the authorization process stores a result of the comparison between the biomorphic sample and the encoded biomorphic pattern, according to one embodiment disclosed herein.

DETAILED DESCRIPTION

Figure 1:
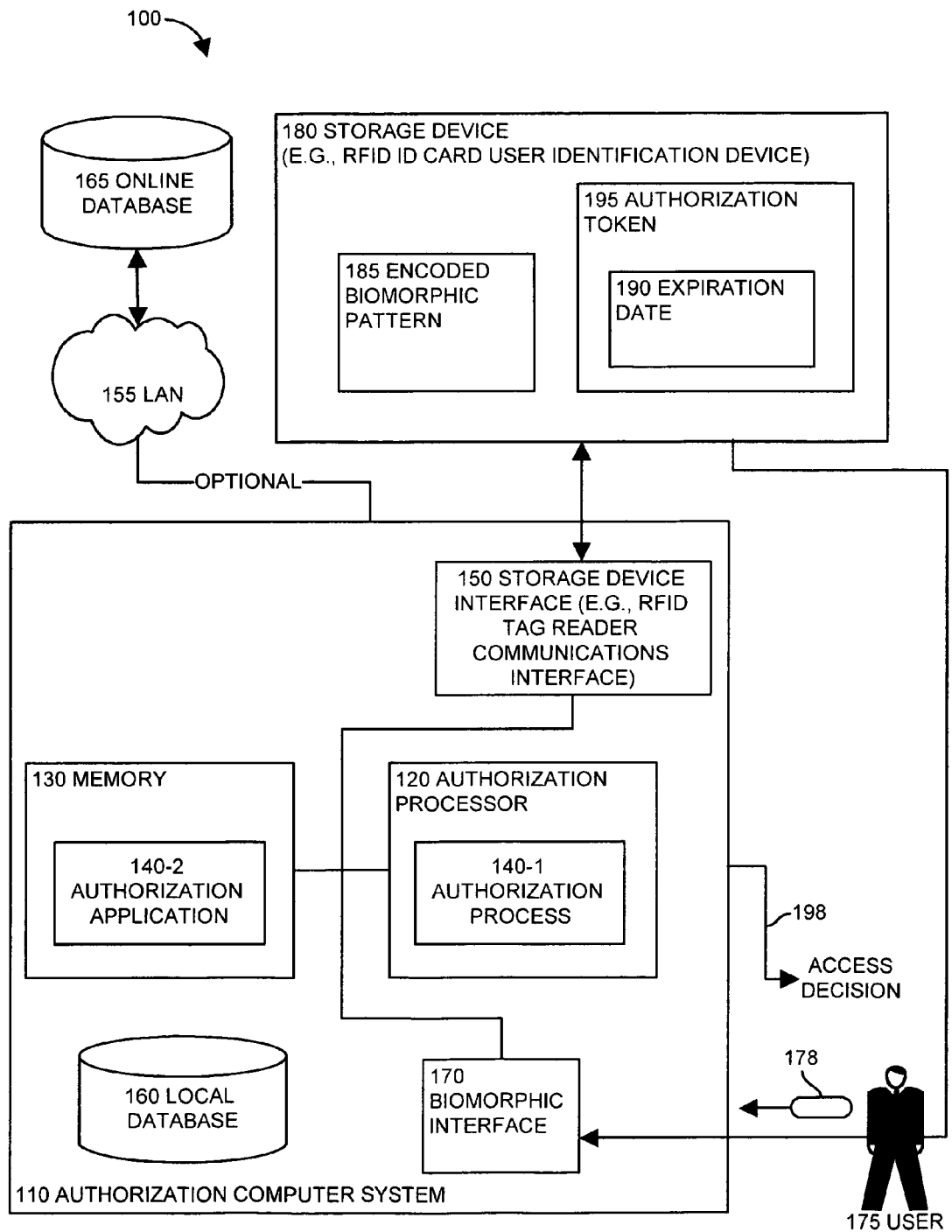
FIG. 1 shows a high level block diagram of a computer system according to one embodiment disclosed herein.

Embodiments disclosed herein include a computer system that performs an authorization process to verify the identity of a user by reading a storage device, provided by the user, containing an encoded biomorphic pattern, and an encoded authorization token, which has an expiration date. The authorization process verifies the validity of the encoded biomorphic pattern on the storage device, and compares the encoded biomorphic pattern to a biomorphic sample received from the user, to verify the identity of the user. The expiration date of the encoded authorization token is checked to ensure the information contained on the storage device is still valid. Once the identity of the user has been verified, and the validity of the information contained on the storage device is confirmed, the user is granted access. If not, access is rejected. The authorization process can be successfully completed even if an online database containing encoded biomorphic patterns is unavailable. If an online database containing encoded biomorphic patterns is available, the authorization process can update the expiration date of the encoded authorization token, extending the authorization access of the user possessing the storage device.

The system disclosed herein includes a computer system containing an authorization process to verify the identity of a user. The authorization process receives an encoded biomorphic pattern from the user, contained on a storage device. To obtain the storage device containing the biomorphic pattern, users must provide a biomorphic sample, which is then encoded (e.g. digitally encrypted) to verify its authenticity, and to prevent tampering. The encoded biomorphic pattern indicates a central authorizing entity has verified the identity of the user whose digitally signed biomorphic pattern is stored on the storage device. The storage device also contains a digitally signed authorization token with an expiration date. The storage device contains a processor which is powered by a mechanism capable of reading the storage device.

The authorization process contains a mechanism capable of reading the storage device, and reads the encoded biomorphic pattern from the storage device. The authorization process verifies the validity of the encoded biomorphic pattern contained on the storage device, provided by the user. If the encoded biomorphic pattern is not valid, the authorization process rejects access to the user. If the encoded biomorphic pattern is an acceptable biomorphic pattern, the authorization process receives a biomorphic sample from the user. Alternatively, the authorization process can receive more than one biomorphic sample from the user, to be used during a comparison process with the encoded biomorphic pattern. The authorization process performs a comparison between the encoded biomorphic pattern contained on the storage device, and the biomorphic sample received from the user. If the encoded biomorphic pattern on the storage device and the biomorphic sample received from the user do not match, the authorization process rejects access to the user. If the encoded biomorphic pattern on the storage device and the biomorphic sample received from the user match, the authorization process reads the encoded authorization token on the storage device. If the expiration date on the encoded authorization token has expired, the authorization process rejects authorization, and the user is not granted access. If the expiration date is still valid, the user is granted access.

Alternatively, the encoded authorization token can contain access information, detailing the amount of information the mechanism capable of reading the storage device, is authorized to read from the storage device. The mechanism capable of reading the storage device can be authorized to read information from the storage device, based on the security level granted to the mechanism capable of reading the storage device.

The computer system containing the authorization process stores the result of the authorization process locally on the computer system performing the authorization process. These results can be uploaded to an online database at a later time.

Alternatively, the authorization process can determine if an online database is accessible. If the online database is connected and available, the authorization process verifies the authorization access of the user with the online database, in order to extend the authorization access of the user. The authorization process then transfers the result of the comparison between the encoded biomorphic pattern contained on the storage device, and the biomorphic sample received from the user, to the online database. The computer system running the authorization process receives from the online database, an encoded authorization token with an updated expiration date. The authorization process updates the storage device with the encoded authorization token containing the updated expiration date. This extends the authorization access of the user, the authorization access to be used during the next authorization process for the user.

FIG. 1 illustrates an example computer environment 100 suitable for use in explaining embodiments of this invention. The authorization computer system 110 contains an authorization processor 120 containing an authorization process 140-1, the authorization processor 120 coupled to a memory system 130 containing an authorization application 140-2. The authorization processor 120 transmits a result of the authorization process 140-1 to a local database 160. The authorization processor 120 receives a biomorphic sample 178 from a user 175 via a biomorphic interface 170. The authorization processor 120 also receives data from a storage device 180 via a storage device interface 150. The storage device 180 contains an encoded biomorphic pattern 185, and an authorization token 195 containing an expiration date 190. The authorization processor 120 transmits and receives data from an online database 165 via a local area network (LAN) 155.

The authorization processor 120 receives an encoded biomorphic pattern 185 on the storage device 180 provided by the user 175. The authorization processor 120 reads the encoded biomorphic pattern 185 on the storage device 180 via the storage device interface 150. The authorization processor 120 verifies the encoded biomorphic pattern 185 is a valid encoded biomorphic pattern 185. If it is, the authorization processor 120 receives a biomorphic sample 178 from the user 175 via the biomorphic interface 170. The authorization processor 120 compares the encoded biomorphic pattern 185 with the biomorphic sample 178 from the user 175. If the two match, the authorization processor 120 attempts to connect to an online database 165 via a LAN network 155.

If the online database 165 is available, the authorization processor 120 transmits to the online database 165, the result of the comparison between the encoded biomorphic pattern 185 with the biomorphic sample 178 from the user 175. In return, the authorization processor 120 receives from the online database 165, an updated authorization token 195 with an updated expiration data 190. The authorization processor 120 updates the storage device 180 with the updated authorization token 195 containing the updated expiration date 190.

If the online database 165 is not available, the authorization processor 120 reads the authorization token 195 from the storage device 180 via the storage device interface 150. The authorization processor 120 examines the authorization token 195 for an expiration date 190. If the expiration date 190 is valid, the authorization processor 120 grants access to the user 175. The authorization processor 120 stores the result of the authorization process 140-1 in the local database 160. The details of this process will be explained in further details in the steps below.

Further details of configurations explained herein will now be provided with respect to a flow chart of processing steps that show the high level operations disclosed herein to perform the authorization process.

Figure 2:
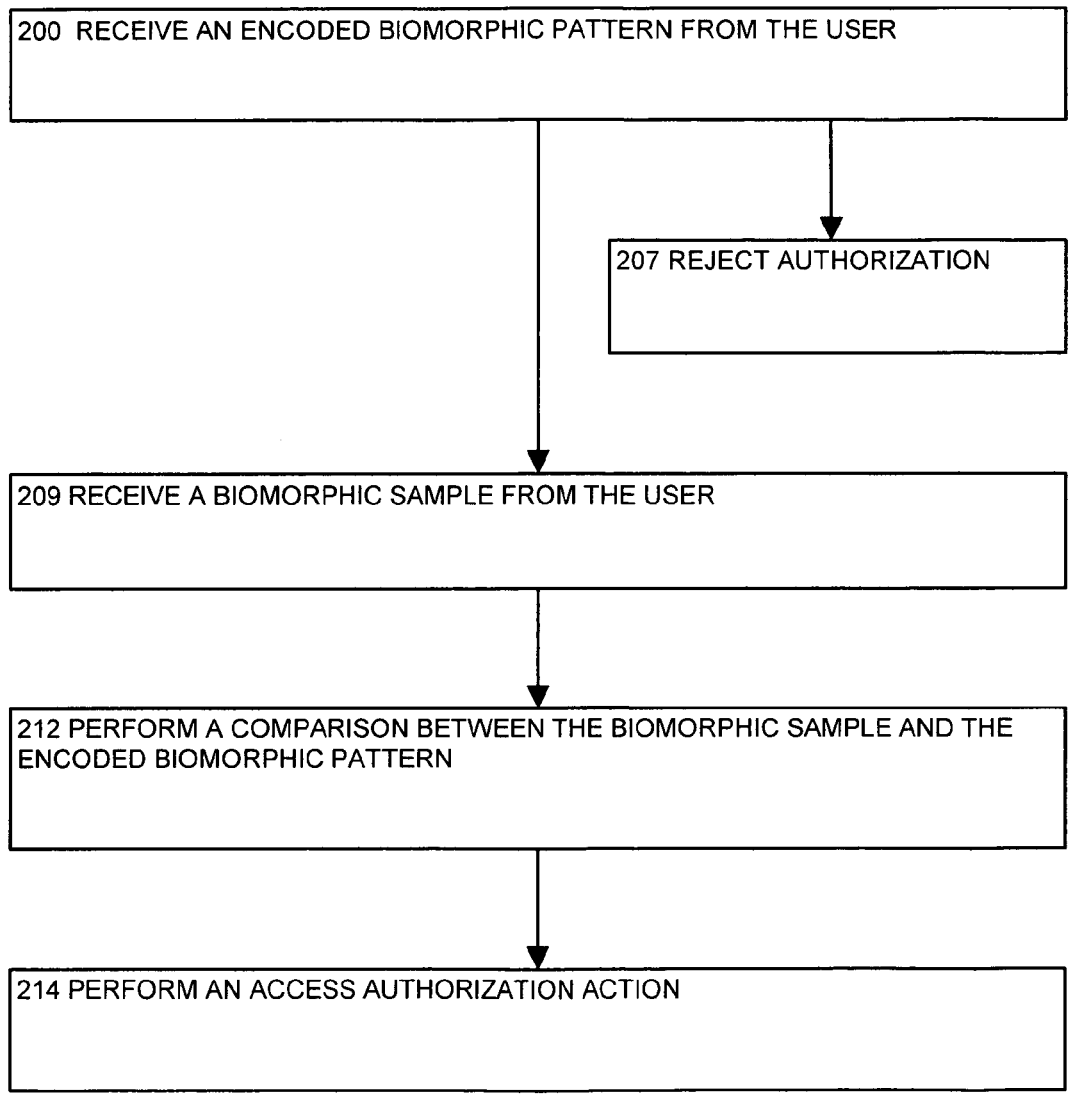
FIG. 2 illustrates a flowchart of a procedure performed by the system of FIG. 1 when the authorization process verifies the identity of a user, according to one embodiment disclosed herein.

FIG. 2 is a flowchart of the steps performed by the authorization computer system 110 when it performs the authorization process 140-1 to verify the identity of a user 175. The authorization processor 120 receives an encoded biomorphic pattern 185 from the storage device 180, via the storage device interface 150, and compares it to a biomorphic sample 178 provided by the user 175, then performs an access authorization action (i.e., access decision 198 in FIG. 1), based on the result of that comparison. The access decision 198 can be any form of access control decision, such as allowing or denying access to an entity (e.g, computer system, area, location, etc.) on behalf of the user 175.

In step 200, the authorization processor 120 receives an encoded biomorphic pattern contained on a storage device 180 from the user 175 via the storage device interface 150. The details of the encoded biomorphic pattern provided by the user 175 will be further explained in sub-steps 201 through 208.

In step 209, the authorization processor 120 receives a biomorphic sample 178 from the user 175 via the biomorphic interface 170. The details of the biomorphic sample 178 provided by the user 175 will be further explained in the sub steps of 210 and 211.

In step 212, the authorization processor 120 performs a comparison between the biomorphic sample 178, and the encoded biomorphic pattern 185 to determine if the biomorphic sample 178 provided by the user 175 matches the encoded biomorphic pattern 185 contained on the storage device 180 provided by the user 175. The details of this comparison will be further explained in sub steps 213 and 215.

In step 214, the authorization processor 120 performs an access authorization action, based on the result of the comparison between the biomorphic sample 178, and the encoded biomorphic pattern 185. The details of the access authorization action will be further explained within the sub steps of 216, 222, 230 through 236.

Figure 3:
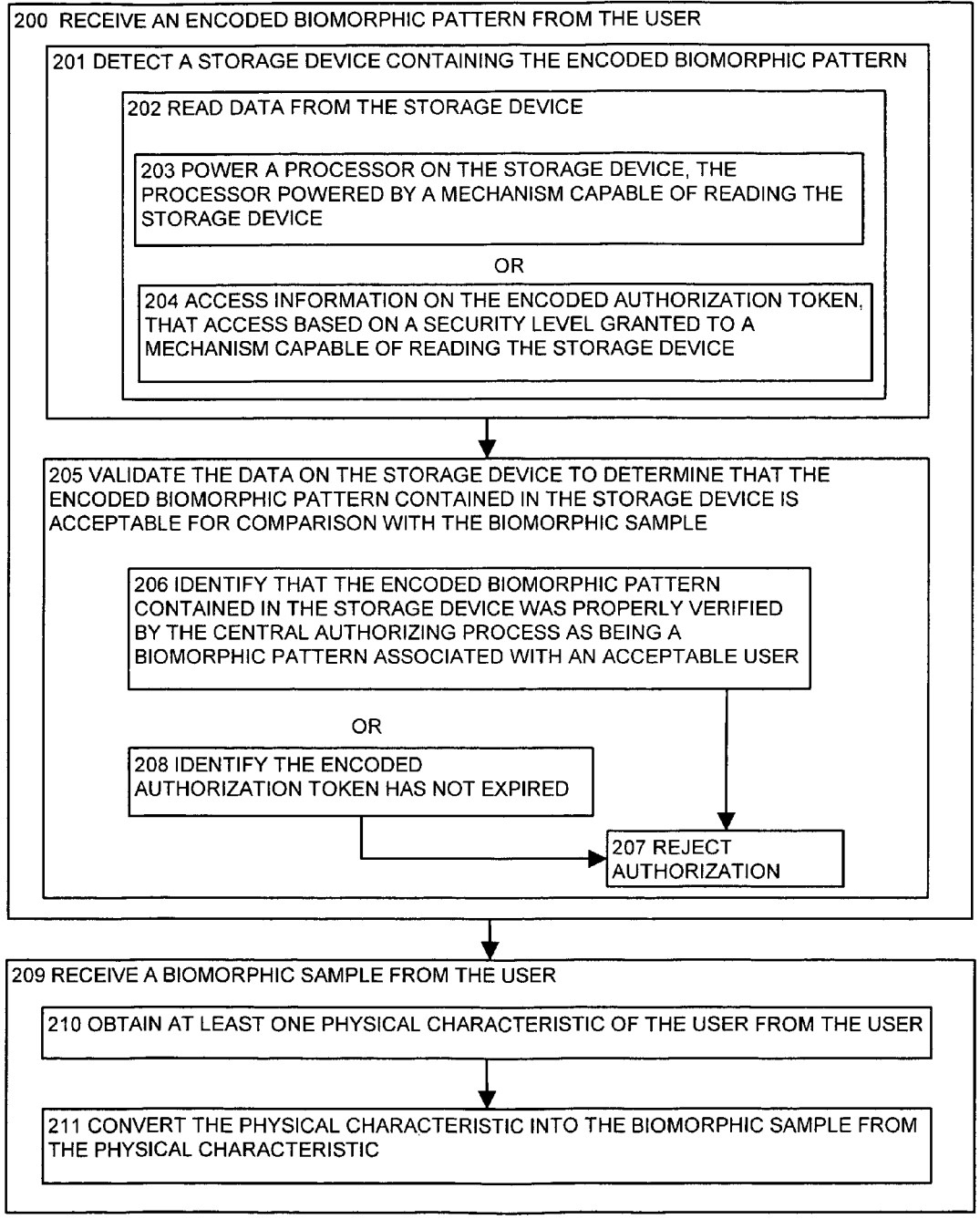
FIG. 3 illustrates a flowchart of a procedure performed by the system of FIG. 2, when the authorization process detects a storage device containing an encoded biomorphic pattern, according to one embodiment disclosed herein.

FIG. 3 is a flowchart of the steps performed by the authorization computer system 110 when the authorization processor 120 receives an encoded biomorphic pattern 185 from the user 175. The encoded biomorphic pattern 185 is contained on a storage device 180 provided by the user 175.

In step 201, the authorization processor 120 detects a storage device 180 containing the encoded biomorphic pattern 185 via the storage device interface 150. The details of detecting the storage device 180 will be further explained within the sub steps of 201 through 208.

In step 202, the authorization processor 120 reads data from the storage device 180. The storage device 180 contains the encoded biomorphic pattern 185, the authorization token 195 and the expiration date 190 contained within the authorization token 195. The details of reading the data from the storage device 180 will be further explained within the sub steps of 203 and 204.

In step 203, the storage device interface 150 powers a processor contained on the storage device 180 in order to read the data (e.g. the encoded biomorphic pattern 185, the authorization token 195 and the expiration date 190) on the storage device 180.

Alternatively, in step 204, the storage device interface 150 accesses the data on the storage device 180. The data the storage device interface 150 is authorized to read is based on the security access level granted to the storage device interface 150.

In step 205, the authorization processor 120 validates the data on the storage device 180 to determine that the encoded biomorphic pattern 185 contained in the storage device 180 is acceptable for comparison with the biomorphic sample 178. The details of this validation will be further explained within the sub step of 206.

In step 206, the authorization processor 120 identifies that the encoded biomorphic pattern 185 contained in the storage device 180 was properly verified by the central authorizing entity as being a biomorphic pattern associated with an acceptable user.

Alternatively, in step 208, the authorization processor 120 identifies that the expiration date 190 within the authorization token 195 has not expired, indicating the authorization token is still valid, and the authorization process continues.

In step 207, if the authorization processor 120 identifies the encoded biomorphic pattern 185 contained in the storage device 180 as not properly verified by the central authorizing entity as being a biomorphic pattern associated with an acceptable user, the authorization processor 120 rejects authorization, and the authorization process ends. Alternatively, if the authorization processor 120 identifies that the expiration date 190 contained within the authorization token 195 has expired, the authorization processor 120 rejects authorization, and the authorization process ends.

In step 209, the authorization processor 120 receives a biomorphic sample 178 from the user 175 via the biomorphic interface 170. The details of receiving the biomorphic sample 178 from the user 175 will be further explained within the sub steps of 210 and 211.

In step 210, the authorization processor 120 receives at least one physical, or biometric, characteristic from the user 175, via the biomorphic interface 150. The biomorphic interface 150 could receive multiple biomorphic samples 178 from a single user 175, to ensure the identity of that user 175.

In step 211, physical characteristic supplied by the user 175, is converted to a biomorphic sample 178 to be used in the comparison with the encoded biomorphic pattern 185 contained on the storage device 180.

Figure 4:
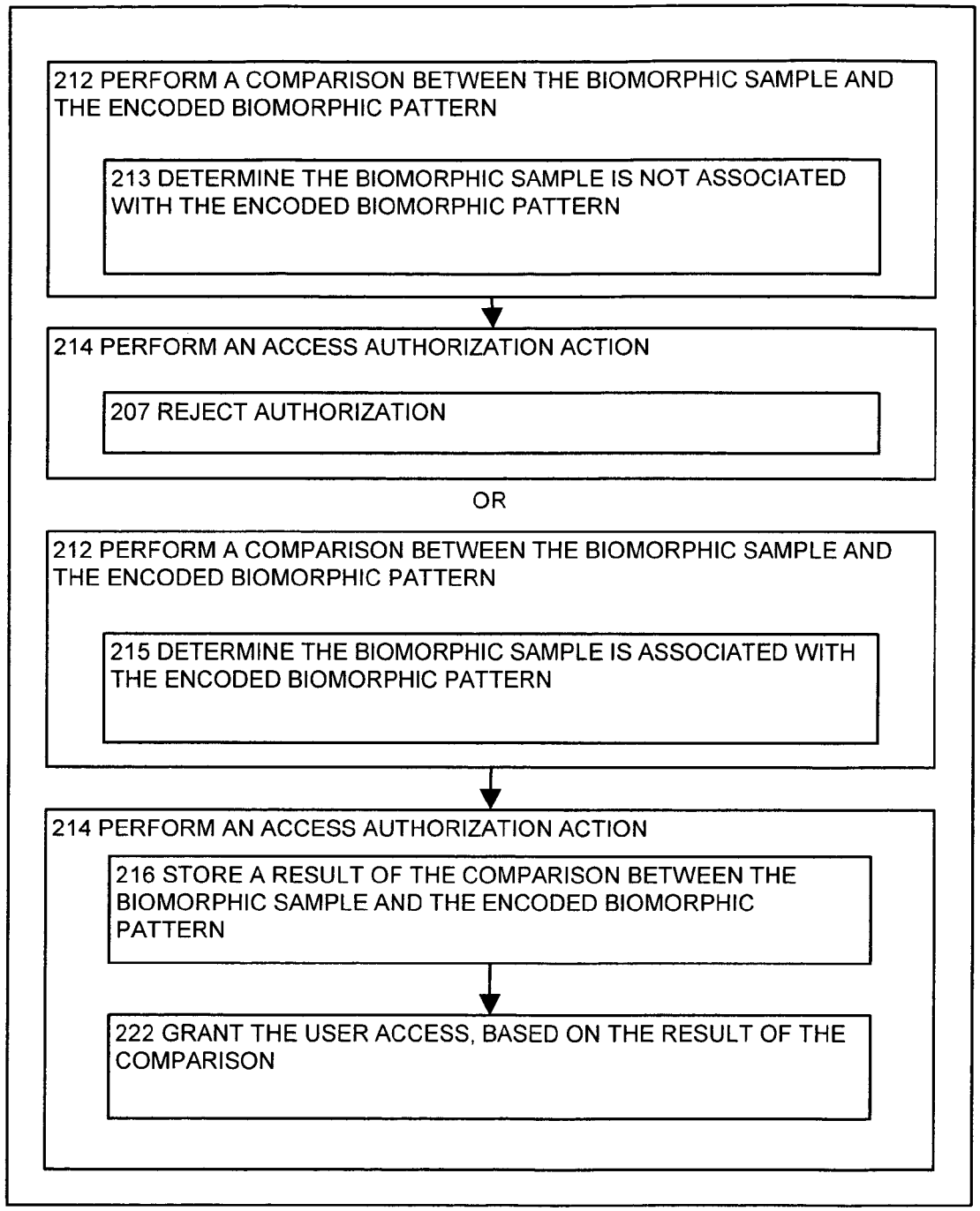
FIG. 4 illustrates a flowchart of a procedure performed by the system of FIG. 2, when the authorization process performs a comparison between the biomorphic sample and the encoded biomorphic pattern, according to one embodiment disclosed herein.

FIG. 4 is a flowchart of the steps performed by the authorization processor 120 when the encoded biomorphic pattern 185 contained on the storage device 180 is compared to the biomorphic sample 178 supplied by the user 175. This comparison verifies the identity of the user 175 presenting the storage device 180.

In step 212, the authorization processor 120 performs a comparison between the encoded biomorphic pattern 185 contained on the storage device 180 and the biomorphic sample 178 provided by the user 175.

In step 213, the authorization processor 120 determines the biomorphic sample 178 is not associated with the encoded biomorphic pattern 185 contained on the storage device 180. This indicates the user 175 presenting the storage device 180 is not the rightful owner of that storage device 180.

In step 214, the authorization processor 120 performs an access authorization action in response to the comparison between the encoded biomorphic pattern 185 and the biomorphic sample 178.

In step 207, the authorization processor 120 rejects authorization, and the authorization process ends.

Alternatively, in step 215, the authorization processor 120 determines the biomorphic sample 178 provided by the user 175 is associated with the encoded biomorphic pattern 185 stored on the storage device 180, verifying the identity of the user 175 possessing the storage device 180.

Based on the successful comparison between the encoded biomorphic pattern 185 contained on the storage device 180 and the biomorphic sample 178 provided by the user 175, in step 214, the authorization processor 120 performs an access authorization action. The details of performing the access authorization action will be further explained within the sub steps of 216 and 222.

In step 216, the authorization processor 120 stores the result of the comparison between the encoded biomorphic pattern 185 contained on the storage device 180 and the biomorphic sample 178 supplied by the user 175. The result is stored on the authorization computer system 110 in the local database 160.

In step 222, the authorization processor 120 grants the user 175 access, based on a successful comparison between the between the encoded biomorphic pattern 185 contained on the storage device 180, and the biomorphic sample 178 supplied by the user 175. The authorization processor 120 has verified the identity of the user 175 presenting the storage device 180 with the encoded biomorphic pattern 185.

FIG. 5 is a flowchart of the steps performed by the authorization processor 120 when authorization processor 120 stores the result of the comparison between the between the encoded biomorphic pattern 185 contained on the storage device 180, and the biomorphic sample 178 supplied by the user 175.

In step 217, the authorization processor 120 determines if an online authorization database 165 is accessible. The online database 165 can be used to perform the comparison between an encoded biomorphic pattern 185 stored in the online database 165 and the biomorphic sample provided by the user 175.

In step 218, the authorization processor 120 verifies the authorization access of the user 175 with the online database 165 in order to extend the authorization access of the user 175. The authorization access indicates the user 175 successfully obtained a storage device 180 containing a properly validated encoded biomorphic pattern 185.

In step 219, the authorization processor 120 transfers the result of the comparison between an encoded biomorphic pattern 185 stored in the online database 165 and the biomorphic sample provided by the user 175 to the online database 165. A successful comparison will result in the extending of the authorization access of the use 175.

In step 220, the authorization processor 120 receives an authorization token 195 from the online database 165. The authorization token 195 sent by the online database 165 contains an updated expiration date 190.

In step 221, the authorization processor 120 updates the encoded biomorphic pattern 185 on the storage device 180 with the updated expiration date 190, to extend the authorization access of the user 175. Based on the updated expiration date 190, the user 175 can successfully pass the authorization process, at a later date, due to a prior successful completion of the authorization process.

While computer systems and methods have been particularly shown and described above with references to configurations thereof, it will be understood by those skilled in the art that various changes in form and details may be made therein without departing from the scope disclosed herein. Accordingly, the present invention is not intended to be limited by the example configurations provided above.

The invention claimed is:

1. In a computer system, a method of verifying an identity of a user, the method comprising:
  receiving an encoded biomorphic pattern from a user identification device, which includes:
    detecting a storage device containing the encoded biomorphic pattern and an encoded authorization token;
    reading data from the storage device;
    validating the data on the storage device to determine that the encoded biomorphic pattern contained in the storage device is acceptable for comparison with the biomorphic sample in order to validate the encoded biomorphic pattern, wherein the step of validating the data includes:
      identifying the encoded authorization token has not expired and rejecting authorization if the encoded authorization token has expired;
  receiving a biomorphic sample from the user;
  performing a comparison between the biomorphic sample and the encoded biomorphic pattern; and
  based on the comparison between the biomorphic sample and the encoded biomorphic pattern, performing an access authorization action.

2. The method of claim 1 wherein reading data from the storage device comprises:

remotely powering a processor on the storage device, the processor within the storage device powered by a mechanism capable of reading the storage device.

3. The method of claim 1 wherein the data encoded in the storage device is an encoded authorization token, and wherein reading data from the storage device comprises:
  accessing information on the encoded authorization token, that access based on a security level granted to a mechanism capable of reading the storage device.

4. The method of claim 1 wherein the data encoded in the storage device is a signature of a central authorizing entity, and wherein validating the data comprises:
  identifying that the encoded biomorphic pattern contained in the storage device was properly verified by the central authorizing entity as being a biomorphic pattern associated with an acceptable user, and if the data does not validate,
  rejecting authorization.

5. The method of claim 1 wherein receiving a biomorphic sample from the user comprises:
  obtaining at least one physical characteristic of the user from the user; and
  converting the physical characteristic into the biomorphic sample from the physical characteristic.

6. The method of claim 1 wherein performing a comparison between the biomorphic sample and the encoded biomorphic pattern comprises:
  determining the biomorphic sample is not associated with the encoded biomorphic pattern; and
  wherein performing an access authorization action comprises;
  rejecting authorization.

7. The method of claim 1 wherein performing a comparison between the biomorphic sample and the encoded biomorphic pattern comprises:
  determining the biomorphic sample is associated with the encoded biomorphic pattern; and
  wherein performing an access authorization action comprises;
  storing a result of the comparison between the biomorphic sample and the encoded biomorphic pattern; and
  granting the user access, based on the result of the comparison.

8. The method of claim 7 wherein storing a result of the comparison between the biomorphic sample and the encoded biomorphic pattern comprises:
  determining if an online authorization database is accessible, and if so,
  verifying an authorization access of the user with the online authorization database in order to extend the authorization access of the user;
    transferring the result of the comparison to the online authorization database;
    receiving an encoded authorization token from the online authorization database; and
    updating the encoded biomorphic pattern with the encoded authorization token, in order to extend the authorization access of the user.

9. The method of claim 1 wherein receiving an encoded biomorphic pattern from the user comprises:
  detecting a storage device containing an encoded biomorphic pattern, the storage device provided by the user;
  powering a processor on the storage device in order to read data from the storage device, the processor powered by a mechanism capable of reading the storage device;
  identifying that the encoded biomorphic pattern contained in the storage device was properly verified by a central authorizing entity as being a biomorphic pattern associated with an acceptable user;
  identifying an encoded authorization token contained in the storage device, the encoded authorization token containing an expiration date;
  verifying the expiration date in the encoded authorization token has not expired; and
  wherein receiving a biomorphic sample from the user comprises:
    obtaining at least one physical characteristic of the user from the user; and
    converting the physical characteristic into a biomorphic sample from the physical characteristic obtained from the user.

10. The method of claim 9 wherein performing an access authorization action comprises:
  storing a result of the comparison between the biomorphic sample and the encoded biomorphic pattern; and
  granting the user access, based on the result of the comparison.

11. The method of claim 9 wherein performing an access authorization action comprises:
  determining if an online authorization database is accessible, and if so,
  verifying an authorization access of the user with the online authorization database in order to extend the authorization access of the user by reporting a positive result of the comparison between the biomorphic sample and the encoded biomorphic pattern;
    transferring the positive result of the comparison between the biomorphic sample and the encoded biomorphic pattern to the online authorization database;
    receiving an updated encoded authorization token from the online authorization database in response to the transferred positive response, the updated encoded authorization token containing an updated expiration date;
  updating the encoded biomorphic pattern contained in the storage device with the updated encoded authorization token containing the updated expiration date, in order to extend the authorization access of the user; and
  granting the user access, based on the positive result of the comparison between the biomorphic sample and the encoded biomorphic pattern and the verification of the authorization access of the user with the online authorization database.

12. A method of claim 1 wherein receiving an encoded biomorphic pattern from the user comprises:
  reading a storage device identity card, the storage device identity card comprising:
  i) a digitally encrypted biomorphic pattern, the digitally encrypted biomorphic pattern indicating an authorizing entity verified the identity of the user possessing the storage device identity card;
  ii) a digitally encrypted authorization token containing an expiration date, the digitally encrypted authorization token provided by the authorizing authority; and
  iii) a java processor powered by a storage device identity card reader;
  verifying the validity of the digitally encrypted biomorphic pattern using at least one private key provided by the authorizing authority; and
  wherein performing an access authorization action comprises:

authenticating the digitally encrypted authorization token using the at least one private key provided by the authorizing authority, the digitally encrypted authorization token indicating the authorization authority verified the identity of the user possessing the storage device identity card;

verifying the expiration date on the storage device identity card is still valid;

determining a result of the verification process; and storing the result of the verification process.

13. A computerized device comprising:

a memory;

a processor;

a biomorphic interface;

a communication interface;

an interconnection mechanism coupling the memory, the processor, the communications interface and the biomorphic interface;

where the memory is encoded with an authorization application that when executed on the processor produces an authorization process that causes the computerized device to verify the identity of a user by performing the operations of:

receiving an encoded biomorphic pattern from a user identification device via the communications interface, which includes:

detecting a storage device containing the encoded biomorphic pattern and an encoded authorization token;

reading data from the storage device;

validating the data on the storage device to determine that the encoded biomorphic pattern contained in the storage device is acceptable for comparison with the biomorphic sample in order to validate the encoded biomorphic pattern, wherein the step of validating the data includes:

identifying the encoded authorization token has not expired and rejecting authorization if the encoded authorization token has expired;

receiving a biomorphic sample from the user via the biomorphic interface;

performing a comparison between the biomorphic sample and the encoded biomorphic pattern; and based on the comparison between the biomorphic sample and the encoded biomorphic pattern, performing an access authorization action.

14. The computerized device of claim 13 wherein when the computerized device performs the operation of reading data from the storage device, the computerized device performs the operation of: remotely powering a processor on the storage device, the processor within the storage device powered by a mechanism capable of reading the storage device.

15. The computerized device of claim 13 wherein the data encoded in the storage device is an encoded authorization token, and wherein when the computerized device performs the operation of reading data from the storage device, the computerized device performs the operation of:

accessing information on the encoded authorization token, that access based on a security level granted to a mechanism capable of reading the storage device.

16. The computerized device of claim 13 wherein the data encoded in the storage device is a signature of a central authorizing entity, and wherein when the computerized device performs the operation of validating the data, the computerized device performs the operation of:

identifying that the encoded biomorphic pattern contained in the storage device was properly verified by the central authorizing entity as being a biomorphic pattern associated with an acceptable user, and if the data does not validate, rejecting authorization.

17. The computerized device of claim 13 wherein when the computerized device performs the operation of receiving a biomorphic sample from the user, the computerized device performs the operation of:

obtaining at least one physical characteristic of the user from the user; and converting the physical characteristic into the biomorphic sample from the physical characteristic.

18. The computerized device of claim 13 wherein when the computerized device performs the operation of performing a comparison between the biomorphic sample and the encoded biomorphic pattern, the computerized device performs the operation of:

determining the biomorphic sample is not associated with the encoded biomorphic pattern; and wherein when the computerized device performs the operation of performing an access authorization action, the computerized device performs the operation of:

rejecting authorization.

19. The computerized device of claim 13 wherein when the computerized device performs the operation of performing a comparison between the biomorphic sample and the encoded biomorphic pattern, the computerized device performs the operation of:

determining the biomorphic sample is associated with the encoded biomorphic pattern; and wherein when the computerized device performs the operation of performing an access authorization action, the computerized device performs the operation of:

storing a result of the comparison between the biomorphic sample and the encoded biomorphic pattern; and granting the user access, based on the result of the comparison.

20. The computerized device of claim 19 wherein when the computerized device performs the operation of storing a result of the comparison between the biomorphic sample and the encoded biomorphic pattern, the computerized device performs the operation of:

determining if an online authorization database is accessible, and if so, verifying an authorization access of the user with the online authorization database in order to extend the authorization access of the user;

transferring the result of the comparison to the online authorization database;

receiving an encoded authorization token from the online authorization database; and updating the encoded biomorphic pattern with the encoded authorization token, in order to extend the authorization access of the user.

21. The computerized device of claim 13 wherein when the computerized device performs the operation of receiving an encoded biomorphic pattern from the user, the computerized device performs the operation of:

detecting a storage device containing an encoded biomorphic pattern, the storage device provided by the user;

powering a processor on the storage device in order to read data from the storage device, the processor powered by a mechanism capable of reading the storage device;

identifying that the encoded biomorphic pattern contained in the storage device was properly verified by a central authorizing entity as being a biomorphic pattern associated with an acceptable user;

identifying an encoded authorization token contained in the storage device, the encoded authorization token containing an expiration date;

verifying the expiration date in the encoded authorization token has not expired; and wherein receiving a biomorphic sample from the user comprises:

obtaining at least one physical characteristic of the user from the user; and converting the physical characteristic into a biomorphic sample from the physical characteristic obtained from the user.

22. The computerized device of claim 21 wherein when the computerized device performs the operation of performing an access authorization action, the computerized device performs the operation of:

storing a result of the comparison between the biomorphic sample and the encoded biomorphic pattern; and granting the user access, based on the result of the comparison.

23. The computerized device of claim 21 wherein when the computerized device performs the operation of performing an access authorization action, the computerized device performs the operation of:

determining if an online authorization database is accessible, and if so, verifying an authorization access of the user with the online authorization database in order to extend the authorization access of the user by reporting a positive result of the comparison between the biomorphic sample and the encoded biomorphic pattern;

transferring the positive result of the comparison between the biomorphic sample and the encoded biomorphic pattern to the online authorization database;

receiving an updated encoded authorization token from the online authorization database in response to the transferred positive response, the updated encoded authorization token containing an updated expiration date;

updating the encoded biomorphic pattern contained in the storage device with the updated encoded authorization token containing the updated expiration date, in order to extend the authorization access of the user; and granting the user access, based on the positive result of the comparison between the biomorphic sample and the encoded biomorphic pattern and the verification of the authorization access of the user with the online authorization database.

24. A computerized device of claim 13 wherein when the computerized device performs the operation of receiving an encoded biomorphic pattern from the user, the computerized device performs the operation of:

reading a storage device identity card, the storage device identity card comprising:

i) a digitally encrypted biomorphic pattern, the digitally encrypted biomorphic pattern indicating an authorizing authority verified the identity of the user possessing the storage device identity card;

ii) a digitally encrypted authorization token containing an expiration date, the digitally encrypted authorization token provided by the authorizing authority; and iii) a java processor powered by a storage device identity card reader;

verifying the validity of the digitally encrypted biomorphic pattern using at least one private key provided by the authorizing authority; and wherein performing an access authorization action comprises:

authenticating the digitally encrypted authorization token using the at least one private key provided by the authorizing authority, the digitally encrypted authorization token indicating the authorization authority verified the identity of the user possessing the storage device identity card;

verifying the expiration date on the storage device identity card is still valid;

determining a result of the verification process; and storing the result of the verification process.

* * * * *